US011530968B2

(12) United States Patent
Dehe et al.

(10) Patent No.: US 11,530,968 B2
(45) Date of Patent: *Dec. 20, 2022

(54) APPARATUS FOR ANALYZING THE PARTICULATE MATTER CONTENT OF AN AEROSOL

(71) Applicant: INFINEON TECHNOLOGIES AG, Neubiberg (DE)

(72) Inventors: Alfons Dehe, Villingen Schwenningen (DE); Christian Bretthauer, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 191 days.

This patent is subject to a terminal disclaimer.

(21) Appl. No.: 16/926,790

(22) Filed: Jul. 13, 2020

(65) Prior Publication Data

US 2020/0340904 A1   Oct. 29, 2020

Related U.S. Application Data

(63) Continuation of application No. 15/830,036, filed on Dec. 4, 2017.

(30) Foreign Application Priority Data

Dec. 5, 2016   (DE) ...................... 10 2016 123 455.9

(51) Int. Cl.
*G01N 15/06* (2006.01)
*G01N 29/032* (2006.01)
(Continued)

(52) U.S. Cl.
CPC ............. *G01N 15/06* (2013.01); *G01N 15/02* (2013.01); *G01N 29/032* (2013.01);
(Continued)

(58) Field of Classification Search
CPC ............ G01N 2015/0046; G01N 2291/02408; G01N 2291/102; G01N 2291/101;
(Continued)

(56) References Cited

U.S. PATENT DOCUMENTS 3,802,271 A * 4/1974 Bertelson ............... G01N 29/22
73/28.01
5,892,141 A * 4/1999 Jones .................... G01N 29/036
73/24.03

(Continued)

FOREIGN PATENT DOCUMENTS

DE           4320039     * 12/1994

*Primary Examiner* — Eric S. McCall
*Assistant Examiner* — Timothy P Graves
(74) *Attorney, Agent, or Firm* — Viering, Jentschura & Partner MBB

(57) ABSTRACT

An apparatus for analyzing the particulate matter content of an aerosol includes an aerosol chamber configured to receive an aerosol, the particulate matter content of which should be analyzed, at least one ultrasonic generator configured to produce ultrasonic waves in the aerosol received in the aerosol chamber, an ultrasonic detector configured to detect ultrasonic waves produced by the at least one ultrasonic generator in the aerosol, and an evaluator having a data exchange communication link with the ultrasonic detector and configured to ascertain the matter content on the basis of signals output by the ultrasonic detector. The ultrasonic generator and the ultrasonic detector are positioned relative to one another such that a path length to be traversed by ultrasonic waves between the ultrasonic generator and the ultrasonic detector is less than 1 cm.

18 Claims, 4 Drawing Sheets

(51) Int. Cl.
*G01N 15/02* (2006.01)
*G01N 15/00* (2006.01)

(52) U.S. Cl.
CPC .............. *G01N 2015/0046* (2013.01); *G01N 2291/02408* (2013.01); *G01N 2291/045* (2013.01); *G01N 2291/048* (2013.01); *G01N 2291/101* (2013.01); *G01N 2291/102* (2013.01)

(58) Field of Classification Search
CPC ...... G01N 15/06; G01N 15/02; G01N 29/032; G01N 2291/045; G01N 2291/048
See application file for complete search history.

(56) References Cited

U.S. PATENT DOCUMENTS

2009/0184830 A1* 7/2009 Watabe ................ G01N 29/024
 340/628
2018/0088017 A1* 3/2018 Mei ........................ G01N 15/06

* cited by examiner

APPARATUS FOR ANALYZING THE PARTICULATE MATTER CONTENT OF AN AEROSOL

CROSS-REFERENCE TO RELATED APPLICATION

This is a continuation application of U.S. non-provisional application Ser. No. 15/830,036, which was filed on Dec. 4, 2017, which claims priority to German Patent Application Ser. No. 10 2016 123 455.9, which was filed Dec. 5, 2016, the contents of both of which are incorporated herein by reference in their entirety.

TECHNICAL FIELD

Various embodiments relate generally to an apparatus for analyzing the particulate matter content of an aerosol and a method for operating such an apparatus.

BACKGROUND

Dust currently counts as one of the main causes for air pollution and substantially contributes to environmental pollution. It has been shown that dust promotes or even causes numerous diseases. These include, in particular, allergies, respiratory diseases and cancer, in particular lung cancer. The extent of the effect of dust particles on the airways depends on the size of the dust particles in addition to their chemical composition. The possible penetration depth into the airways increases as the dust particles becomes smaller. Dust particles with a diameter of less than 10 μm are referred to as particulate matter. These particles are particularly worrisome from a health point of view since the filter effect of the nasal cavity and pharynx is insufficient for these and they therefore are able to reach the lung virtually unimpeded.

The detection of particulate matter requires increasing outlay, the smaller the diameters are. However, in order to better estimate the health risks caused by particulate matter, apparatuses, and methods for operating these apparatuses, which facilitate a simple and flexible detection of these particles are required.

SUMMARY

An apparatus for analyzing the particulate matter content of an aerosol includes an aerosol chamber configured to receive an aerosol, the particulate matter content of which should be analyzed, at least one ultrasonic generator configured to produce ultrasonic waves in the aerosol received in the aerosol chamber, an ultrasonic detector configured to detect ultrasonic waves produced by the at least one ultrasonic generator in the aerosol, and an evaluator having a data exchange communication link with the ultrasonic detector and configured to ascertain the matter content on the basis of signals output by the ultrasonic detector. The ultrasonic generator and the ultrasonic detector are positioned relative to one another such that a path length to be traversed by ultrasonic waves between the ultrasonic generator and the ultrasonic detector is less than 1 cm.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
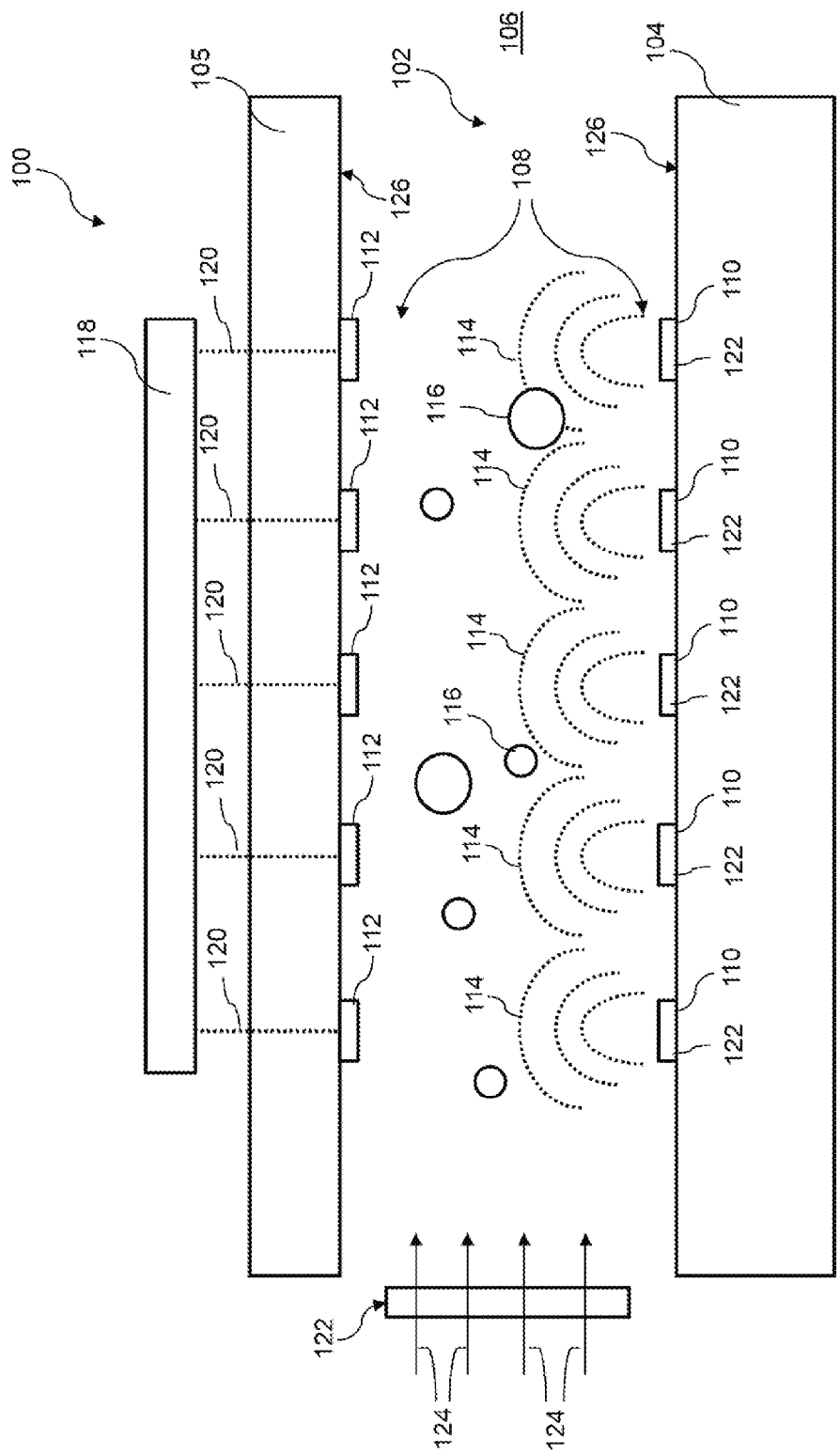
FIG. 1 shows a schematic illustration of an apparatus for analyzing the particulate matter content of an aerosol, according to various embodiments.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

In the present application, "particulate matter" denotes dust with a particle size of less than 10 μm.

In the present application, the term "aerosol" denotes a heterogeneous mixture of a gas and particles, in particular particulate matter, contained therein.

An "evaluation unit" according to the present invention may be, very generally, a data processing unit implemented with a processor. By way of example, the processor may be implemented as a microcontroller or/and as a digital signal processor (DSP) or/and as a field programmable gate array (FPGA) or/and as an application-specific integrated circuit (ASIC). The evaluation unit also may have a memory in which program instructions for the processor can be stored. The program instructions stored in the memory can contain instructions, to be carried out by the processor, for analyzing the particulate matter content of an aerosol from signals output by ultrasonic detectors.

In the drawings, the same reference signs relate to the same parts in the various views. The drawings serve primarily to elucidate the principles essential to the invention and are therefore not necessarily true to scale.

FIG. 1 shows an exemplary apparatus 100 for analyzing the particulate matter content of an aerosol, according to various embodiments. The apparatus 100 has an aerosol chamber 102 which is configured to receive an aerosol, the particulate matter content of which is to be analyzed. The aerosol may be a heterogeneous mixture of ambient air and particulate matter contained therein.

As shown in FIG. 1, the aerosol chamber 102 may be formed between two substrates 104, 105, which are arranged spaced apart from one another and directly delimit the aerosol chamber 102. As indicated in FIG. 1, the aerosol chamber 102 may have a permanent aerosol exchange connection with its surroundings 106. As a result thereof, it is possible, for example, to accurately monitor the particulate matter content of the ambient air since the particulate matter content in the aerosol chamber 102 substantially corresponds to that of the surroundings 106 at all times in the case of the apparatus 100 shown in FIG. 1.

The apparatus 100 may have a plurality of direct detection arrangements 108, each having an ultrasonic generator 110 and an ultrasonic detector 112 formed separately from the ultrasonic generator 108. The ultrasonic generators 108 are configured to emit ultrasonic waves 114, the ultrasonic detectors 112 being arranged in the sound emission regions of the respective ultrasonic generators 110 in the direct detection arrangements 108 shown in FIG. 1. This means that the ultrasonic waves 114 emitted by the ultrasonic generators 110 are emitted in the direction of the respective ultrasonic detectors 112 and the ultrasonic detectors 112 therefore are able to directly detect the ultrasonic waves 114, without there being a need for an additionally provided deflection body for deflecting the ultrasonic waves to the ultrasonic detectors 112.

Ultrasound refers to sound waves having frequencies above the frequency range perceivable by human hearing, i.e. having frequencies above approximately 20 kHz. The ultrasonic waves 114 emitted by the ultrasonic generators 110 interact with the gas in the aerosol chamber 102 and with particles contained in the gas, and said ultrasonic waves are damped accordingly. The damping properties of the aerosol consequently depend on, for example, the particle content, for example the particle density or the mean particle size. In FIG. 1, the particles to be detected or analyzed are provided with the reference sign 116.

As shown in FIG. 1, the ultrasonic generators 110 can be arranged on one side of a substrate 104, said side facing the aerosol chamber 102. The ultrasonic detectors 112 can be arranged opposite the respective ultrasonic generators 110 in one area of the other substrate 105, said area facing the aerosol chamber 102. As a result, the ultrasonic waves 114 emitted by a specific ultrasonic generator 110 can be detected selectively by a specific ultrasonic detector 112. As mentioned above, a pair made up of an ultrasonic generator 110 and an ultrasonic detector 112 lying opposite thereto respectively form a direct detection arrangement 108. In the embodiments shown in FIG. 1, five direct detection arrangements 108 are illustrated. However, the number thereof is self-evidently not restricted to five but can be modified as desired according to demand.

The ultrasonic detectors 112 have a data exchange communication link to an evaluation unit 118, for example via respective data lines 120, and can transmit signals to said evaluation unit, the signals corresponding to properties of the detected ultrasonic waves, such as ultrasonic energy or/and ultrasonic frequency. From this, the evaluation unit 118 is able to ascertain an ultrasound damping coefficient of the aerosol in the aerosol chamber 102. The evaluation unit 118 is subsequently able to ascertain the particulate matter content of the aerosol to be analyzed by comparing the ascertained ultrasound damping coefficient to an analytic expression which specifies a mathematical relationship between the ultrasound damping coefficient and probability density function of a particle size. Mathematically, this comparison can be described by a Fredholm integral equation:

$$\alpha(\omega) = \int_a^b N(r) \cdot K(\omega, r) dr.$$

In this equation, $\omega$ denotes the ultrasonic frequency, $\alpha$ denotes the ultrasound damping coefficient, $N(r)$ denotes a probability density function of the particle size $r$, $K(\omega, r)$ denotes a kernel function, and $a$, $b$ denote respective limits of integration corresponding to the smallest and largest particle size, respectively.

The particulate matter content of the aerosol to be analyzed is substantially characterized by the probability density function $N(r)$. Therefore, the equation above should be solved for $N(r)$ for the purposes of analyzing the particulate matter content of the aerosol.

The equation above cannot be solved analytically. Therefore, the equation above cannot be solved for $N(r)$ in analytic fashion. However, a multiplicity of numerical methods have been proposed, with the aid of which the probability density function is ascertainable from the integral equation above. Reference is made, in a purely exemplary manner, to: R. Vanck, H. Luck, N. Bernigau (1990): "Advanced inversion technique of the fredholm integral equation for the determination of particle size distribution", Proc. 3rd int. Aerosol Conference, Pergamon Press, N.Y. or P. Beckford, H. Luck, G. Hofelmann: "Fast Determination of the Particle Size of Aerosols and Hydrosols by Measuring the Attenuation of Sonic Waves", J. Aerosol Sci., Vol. 23, Suppl. 1, pp. 317-320, 1992. These publications also specify expressions for the kernel function $K(\omega, r)$.

With the aid of the probability density function $N(r)$, it is possible to ascertain further variables that characterize the particulate matter content of the aerosol, for example a mean particle size or a particle density.

Additionally, the evaluation unit 118 may be embodied as a control unit for controlling (e.g. regulating) the ultrasonic generators 110 and may have a data exchange communication link therewith by way of data lines that are not, however, shown in FIG. 1.

Ultrasonic frequencies in the MHz-range are required for detecting particulate matter with a diameter of less than 1 μm. However, sound damping is very high in this frequency range (e.g. 80 dB/mm at 20 MHz), and so the damping property of the aerosol becomes ever more difficult to ascertain with increasing ultrasonic frequency as the intensity of ultrasonic waves emitted by an ultrasonic generator 110 is damped along the path to an ultrasonic detector 112 to such an extent that a detection by an ultrasonic detector 112 is no longer possible in a reliable manner or no longer possible at all.

According to the present invention, this problem is counteracted by adapting a path length to be traversed by ultrasonic waves between an ultrasonic generator 110 and an ultrasonic detector 112 assigned thereto. According to the invention, this path length is less than 1 cm, optionally less than 5 mm, further optionally less than 1 mm or even less than 500 μm. By way of example, in the embodiment shown in FIG. 1, such a path length can be provided by adjusting the distance between the substrates 104 and 105.

The aerosol chamber 102 may have a volume of less than 1 cm³, optionally of less than 500 mm³, further optionally of less than 100 mm³ or even less than 50 mm³. As a result of this, it is possible, for example, to ensure speedy aerosol exchange between aerosol chamber 102 and its surroundings 106, as a result of which a quickly changing particulate matter amount in the ambient air can be captured quickly.

A gas or aerosol exchange between aerosol chamber 102 and its surroundings 106 can be effectuated, for example, exclusively by diffusion. Compared therewith, a faster aerosol exchange can be obtained by an aerosol conveying arrangement 122 which is configured to convey aerosol between the aerosol chamber 102 and its surroundings 106. In FIG. 1, aerosol supplied from outside of the aerosol chamber 102 into the aerosol chamber 102 by way of the aerosol conveying arrangement 122 is symbolized by the arrows 124.

By way of example, the aerosol conveying arrangement 122 may have a micro-pump or/and a peristaltic drive or/and a thermal drive. Alternatively, or additionally, the ultrasonic generators 110 also may be part of the aerosol conveying arrangement 122. By way of example, the ultrasonic generators 110 may be operated in a predetermined temporal sequence, e.g. cyclically, in order to produce a pressure gradient or travelling waves in the aerosol chamber 102 which, in turn, have an aerosol conveying effect as a consequence.

By way of example, the apparatus 100 can operate the ultrasonic generators 110 in a detection mode during a predetermined detection time period, in which the particulate matter content of the aerosol to be analyzed is ascertained or analyzed, and said apparatus can be operated in an aerosol conveying mode during an aerosol conveying duration that differs from the detection duration, the ultrasonic generators 110 being operated to convey aerosol in said aerosol conveying mode. Naturally, an aerosol conveying means, such as a micro-pump, which has a separate embodiment from the ultrasonic generators 110 can be operated continuously, i.e. also when the ultrasonic generators 110 are operated in the detection mode.

By providing and operating an aerosol conveying arrangement 122, it is possible not only to increase the aerosol exchange rate between aerosol chamber 102 and its surroundings 106, but also to ensure that particulate matter is not permanently deposited in the aerosol chamber 102 as this could lead to a systematic measurement error. A non-stick coating 126 on an area facing the aerosol chamber 102 of at least one, or of both, substrates 104, 105 is additionally able to prevent permanent deposition of particulate matter in the aerosol chamber 102. In principle, any hydrophobic material is suitable as material for the non-stick coating 126, for example FDTS (perfluorodecyltrichlorosilane).

Below, a second embodiment of the present invention is described with reference to FIG. 2. In the description of the second embodiment, equivalent and functionally equivalent elements to those in FIG. 1 are provided with the same reference signs, albeit increased by the number 100. The second embodiment will only be described to the extent that it differs from the first embodiment, the description of the latter otherwise being explicitly referred to.

Figure 2:
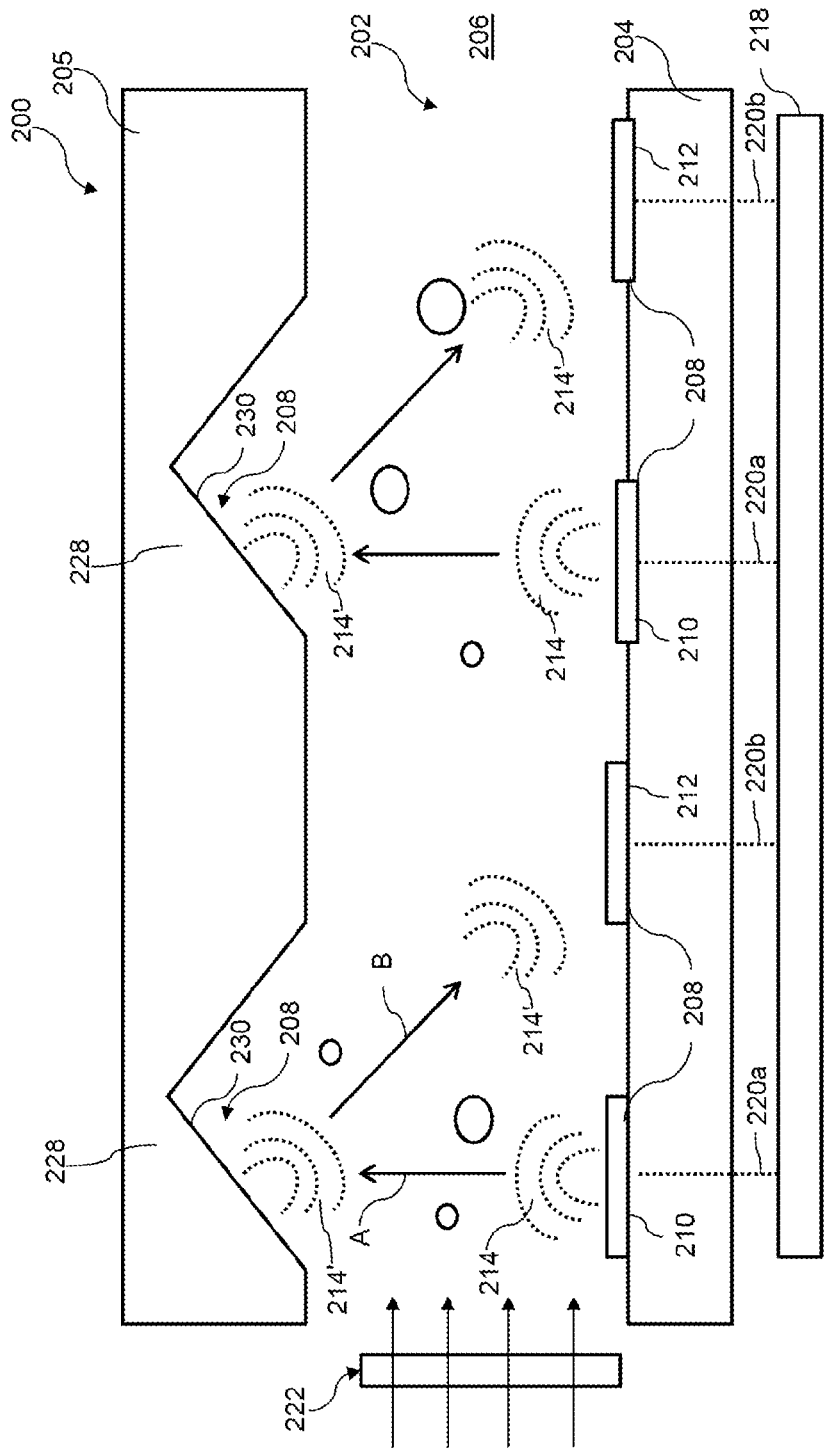
FIG. 2 shows a schematic illustration of an apparatus for analyzing the particulate matter content of an aerosol, according to various embodiments.

In contrast to the apparatus 100 shown in FIG. 1, the apparatus for analyzing the particulate matter content of an aerosol 200, as shown in FIG. 2, does not have any direct detection arrangements, but rather a plurality of indirect detection arrangements 208 with in each case an ultrasonic generator 210, an ultrasonic detector 212 and a deflection body 228 having a deflection area 230, said deflection area 230 being designed to deflect ultrasonic waves 214 emitted from the ultrasonic generator 210 of an indirect detection arrangement 208 to the respective ultrasonic detector 212 of the indirect detection arrangement 208.

In contrast to the direct detection arrangement 108 shown in FIG. 1, an ultrasonic detector 212 is not arranged in the emission region of an ultrasonic generator 210 and therefore it cannot be directly irradiated by the latter. Instead, an ultrasonic detector 212 is irradiated indirectly by an ultrasonic generator 210 by virtue of the ultrasonic waves 214 emitted by an ultrasonic generator 210 being deflected in the direction of an ultrasonic detector 212 at the deflection area 230 of the respective indirect detection arrangement 208. A principal ultrasound emission direction A of an ultrasonic generator 210 corresponds to a principal ultrasound propagation direction of the ultrasonic waves emitted by the ultrasonic generator 210 and it is denoted by an arrow A in FIG. 2, while a principal ultrasound propagation direction of the ultrasonic waves 214' deflected at a deflection area 230 is labelled by an arrow B.

As indicated in FIG. 2, one or more deflection areas 230 can have a substantially planar embodiment and extend along a deflection area plane. Here, a plane area means an area whose curvature is substantially equal to zero at each point. The principal ultrasound propagation direction A of the ultrasonic waves 214 emitted by at least one ultrasonic generator 210 may include an angle that differs from 90° with the deflection area in order to deflect a significant component of the energy of the ultrasonic waves 214 incident on the deflection area 230 in the direction of a specific ultrasonic detector 212 in a defined manner.

The aerosol chamber 202 of the apparatus, shown in FIG. 2, for analyzing the particulate matter content of an aerosol 200 can be defined by two substrates 204, 205, like in the first embodiment, said substrates being arranged at a distance from one another and directly delimiting the aerosol chamber 202.

In contrast to the apparatus 100 shown in FIG. 1, the ultrasonic generator 210 and the ultrasonic detector 212 of an indirect detection arrangement 208 are arranged on one side of the same substrate 204, said side facing the aerosol chamber 202. As shown in FIG. 2, the deflection body 228 may be embodied as an integral part of the other substrate 205. The deflection area 230 of a deflection body 228 may be embodied as one area of this substrate 205, said area facing the aerosol chamber 202.

In contrast to the embodiment shown in FIG. 1, all ultrasonic generators 210 and all ultrasonic detectors 212 may be arranged on a single substrate 204 in the second embodiment. As a result, the production of the apparatus 200 may be simplified since only one of the substrates 204 needs to be e.g. structured in order to produce the respective ultrasonic generators 210 and ultrasonic detectors 212. Moreover, the ultrasonic generators 210 and ultrasonic detectors 212 can easily be connected to an evaluation unit 218, which is embodied as a control unit for controlling (e.g. regulating) the ultrasonic generators 210 at the same time, by way of respective data lines 220a and 220b, since both the ultrasonic generators 210 and the ultrasonic detectors 212 are arranged on a single side of the aerosol chamber 202 and it is therefore not necessary to lay any data lines that span across the aerosol chamber 202.

In contrast to the apparatus 100 shown in FIG. 1, in the apparatus 200 the path length to be covered by ultrasonic waves, according to various embodiments, between an ultrasonic generator 210 of an indirect detection arrangement 208 and an ultrasonic detector 212 of the same indirect detection arrangement 208 is more than twice the length of that in the apparatus 100 according to the first embodiment when the distance between the respective substrates is the same as in the first embodiment.

The higher ultrasound damping caused hereby can be compensated by reducing the distance between the substrates 204 and 205. The distance between the substrates 204 and 205 of the apparatus 200 according to various embodiments can be less than 5 mm, optionally less than 1 mm, further optionally less than 500 µm or even less than 250 µm.

As a result of the angle of inclination of the deflection areas 230 relative to the principal ultrasound emission direction A of the ultrasonic detectors 210, which may be less than 90° in various embodiments, the ultrasonic waves 214' deflected at the deflection areas 230 have momentum parallel to the substrates 204 and 205, i.e. momentum in the principal direction of extent of the aerosol chamber 202. As a result of this, a travelling wave can be generated effectively in the aerosol chamber 202 which, firstly, has an aerosol conveying effect in order to increase the aerosol exchange rate between the aerosol chamber 202 and its surroundings 206 and, secondly, is able to prevent a permanent deposition of particulate matter in the aerosol chamber 202. In various embodiments, this configuration offers the option of permanently operating the apparatus 200 in a detection mode such that there is no need for intermittent switchover between a detection mode and an aerosol conveying mode. In this manner, the particulate matter content in the surroundings 206 of the aerosol chamber 202 can be monitored substantially continuously. However, this should not preclude the provision of an aerosol conveying mode like in the embodiments as shown in FIG. 1. Likewise, the apparatus 200 may also have an aerosol conveying arrangement 222 with an aerosol conveying means, such as a micro-pump, which differs from the ultrasonic generators 210.

As explained above, an indirect detection arrangement 208 in the embodiments as shown in FIG. 2 has an ultrasonic generator 210, an ultrasonic detector 212 and a deflection body 228 with a deflection area 230. In the exemplary apparatus 200 according to the embodiments as shown in FIG. 2, provision is made of two indirect detection arrangements 208. However, the number thereof is self-evidently not restricted thereto but can be modified according to demand.

The respective ultrasonic generators 110 and 210 and the respective ultrasonic detectors 112 and 212 can be embodied as ultrasonic transducers in both the apparatus 100 according to the embodiments shown in FIG. 1 and the apparatus 200 according to the embodiments as shown in FIG. 2. By way of example, an ultrasonic transducer can have a piezoelectric membrane which is deformable by ultrasonic waves to be detected. As a result of a mechanical deformation of the piezoelectric membrane, an electric voltage is produced in the latter, said voltage being able to be read by a suitable evaluation circuit in a detection mode. Properties of the ultrasonic waves, such as the frequency or energy thereof, can be deduced from the read voltage signal. By applying an AC voltage to the piezoelectric membrane, the membrane can be made to vibrate in a generator mode, as a result of which it is possible to produce ultrasonic waves.

Alternatively, an ultrasonic transducer can be embodied as a capacitive micromachined ultrasonic transducer (CMUT). Such an ultrasonic transducer has two opposing electrodes, a fixed electrode and a movable electrode. A capacitive micromachined ultrasonic transducer can be operated both in a detector mode and in a generator mode. In the detector mode, a constant electric voltage is applied to both electrodes and the capacitance between the two electrodes is measured. The movable electrode can be made to vibrate by ultrasonic waves to be detected, with the capacitance between the electrodes being changeable as a result of a displacement of the movable electrode. It is possible to deduce properties of the ultrasonic waves to be detected from the detected capacitance. In the generator mode, an electric AC voltage can be applied to the electrodes, as a result of which the movable electrode can be made to vibrate and produce ultrasonic waves.

Below, various embodiments are described with reference to FIG. 3. In the description of these embodiments, equivalent and functionally equivalent elements are provided with the same reference signs as in the embodiments shown in FIG. 1, albeit increased by the number 200. The embodiments as shown in FIG. 3 will only be described to the extent that it differs from the embodiments shown in FIG. 1 and the embodiments as shown in FIG. 2, the respective descriptions thereof otherwise being explicitly referred to.

FIG. 3 illustrates an apparatus, generally provided with the reference sign 300, for analyzing the particulate matter content of an aerosol. In a manner similar to the embodiments as shown in FIG. 1 and the embodiments as shown in FIG. 2, the apparatus 300 has two spaced-apart substrates 304, 305 which define an aerosol chamber 302 therebetween, said aerosol chamber being configured to receive an aerosol, the particulate matter content of which is to be analyzed. The apparatus 300 has a plurality of transducer indirect detection arrangements 308, each having an ultrasonic transducer 309 and respectively one deflection body 328 assigned to the ultrasonic transducer 309. Here, each ultrasonic transducer 309 can be considered to be a unit made of an ultrasonic generator 310 and an ultrasonic detector 312. In these embodiments, the deflection bodies 328 of the respective transducer indirect detection arrangements 308 may be embodied as integral sections of the substrate 305 lying opposite to the ultrasonic transducers 309 and may each have a deflection area 330 facing the aerosol chamber 302.

Consequently, each transducer indirect detection arrangement 308 has respectively one ultrasonic transducer 309 and one deflection body 328 assigned thereto, the latter having a deflection area 330. A total of five transducer indirect detection arrangements 308 are illustrated in FIG. 3. However, the number thereof is not restricted thereto but can be modified according to demand.

As described above, the respective ultrasonic transducers 309 can be operated in a generator mode, in which they are operable as ultrasonic generators 310. In the generator mode, the ultrasonic transducers 309 can be operated to produce ultrasonic waves 314. The ultrasonic waves 314 produced by the latter can be emitted in the direction of the respective deflection areas 330 in the embodiments shown in FIG. 3. Said ultrasonic waves are deflected or reflected at the respective deflection areas 330. The reflected ultrasonic waves 314' travel back towards the ultrasonic transducers 309. Here, the ultrasonic transducers 309 can be operated in pulsed fashion and can be switched over into a detector mode during the time which the ultrasonic wave pulses require for traversing the aerosol chamber 302 to a deflection area 330 and back to the respective ultrasonic transducer 309 from the deflection area 330, said ultrasonic transducers being operated as ultrasonic detectors 312 in said detector mode in order to be able to detect the return-reflected ultrasonic wave pulses 314'.

The deflection areas 330 can be respectively embodied as plane areas which each extend along a respective deflection area plane. Here, a plane area is an area which has a curvature of substantially zero at each point. A principal ultrasound propagation direction A of the ultrasonic waves 314 emitted by the respective ultrasonic transducers 309 can be orthogonal to the deflection areas 330 assigned thereto. As a result of this, it is possible to ensure that the principal ultrasound propagation directions B of the reflected ultrasonic waves 314' are substantially parallel to the principal ultrasound propagation directions A, corresponding thereto, of the ultrasonic waves 314 emitted by the ultrasonic transducers 309. In this way, the ultrasonic waves 314 impinging on the respective deflection areas 330 can be reflected to the respective ultrasonic transducers 309 in a targeted manner. As a result of this, it is possible, in turn, to ensure that the reflected ultrasonic waves 314' arrive with a high intensity at the ultrasonic transducers 309 operated in the detector mode such that this can ensure a high detection efficiency and consequently an accurate determination of the particulate matter content of the aerosol received in the aerosol chamber 302.

As a result of being able to provide all ultrasonic transducers 309 on a single substrate 304, the apparatus for analyzing the particulate matter content of an aerosol 300 can be produced in a simple manner and the ultrasonic transducers 309 can be actuated or read in a simple manner. To this end, provision can be made of a control unit or read-out unit 318, which may have a data exchange communication link with the respective ultrasonic transducers 309 by way of respective data lines 320. The control unit or read-out unit 318 may be configured to operate the ultrasonic transducers 309 in a generator mode and in a detector mode. Thus, by way of example, the control unit 318 can be operated as a read-out unit for analyzing the particulate matter content of the aerosol.

Figure 3:
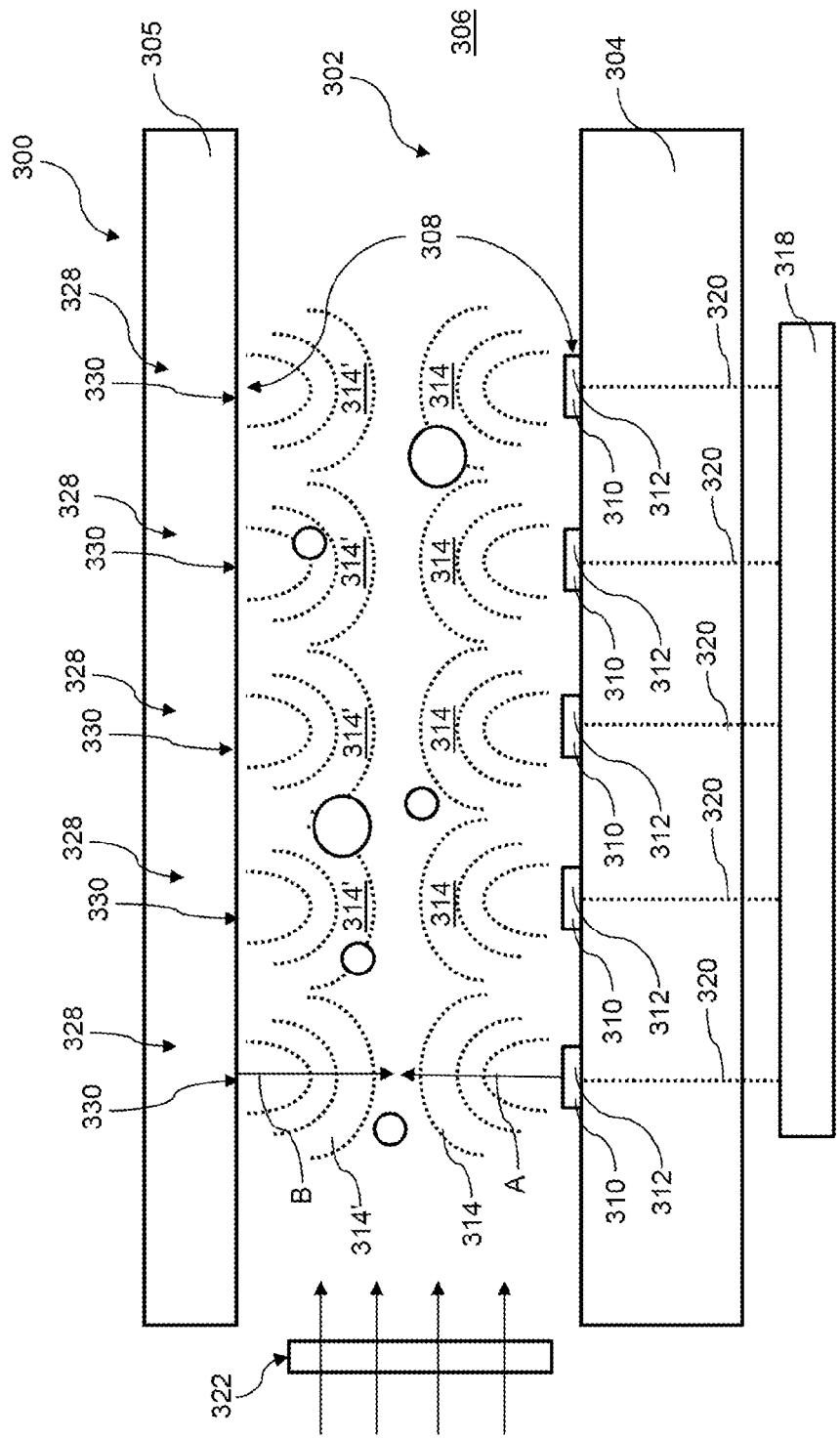
FIG. 3 shows a schematic illustration of an apparatus for analyzing the particulate matter content of an aerosol, according to various embodiments.

In the embodiments as shown in FIG. 3, the path length to be traversed by the ultrasonic waves in the aerosol chamber 302 is twice as long as in the embodiments as shown in FIG. 1 in the case of the same distance between the substrates as in the embodiments as shown in FIG. 1. The higher ultrasound damping caused hereby can be compensated by reducing the distance between the substrates 304 and 305 in comparison with the embodiments as shown in FIG. 1. The distance between the substrates 304 and 305 of the apparatus 300 according to the embodiments as shown in FIG. 3 can be less than 5 mm, optionally less than 1 mm, further optionally less than 500 µm or even less than 250 µm.

As indicated in FIG. 3, the apparatus 300 according to the embodiments as shown in FIG. 3 may also have an aerosol conveying arrangement 322. When operated as ultrasonic generators, the ultrasonic transducers 309 may also be part of the aerosol conveying arrangement 322. Reference is made to the corresponding explanations relating to the embodiments as shown in FIG. 1.

It is clear that the embodiments described above can be combined with one another in different ways. Thus, for example, an embodiment in which at least two arrangements from a direct detection arrangement, an indirect detection arrangement and a transducer indirect detection arrangement are provided is conceivable. An embodiment having a direct detection arrangement, an indirect detection arrangement and a transducer indirect detection arrangement is likewise conceivable.

As explained above, the volumes of the aerosol chambers 102, 202, 302 in the preceding embodiments may be less than 1 cm³. In various embodiments, this allows the apparatuses 100, 200, 300 to be configured as mobile apparatuses which can be carried along by individual persons without much outlay. Alternatively, the apparatuses 100, 200, 300 can be integrated into mobile apparatuses, such as cellular telephones. In various embodiments, this offers the option of centrally collecting relevant data in respect of particulate matter pollution and creating a particulate matter map in which the relevant data in respect of particulate matter pollution, such as a mean particulate matter size or density, are specified in a spatially dependent matter. Such a particulate matter map may be publicly accessible in order to inform a large number of people about the particulate matter pollution in a certain region.

Figure 4:
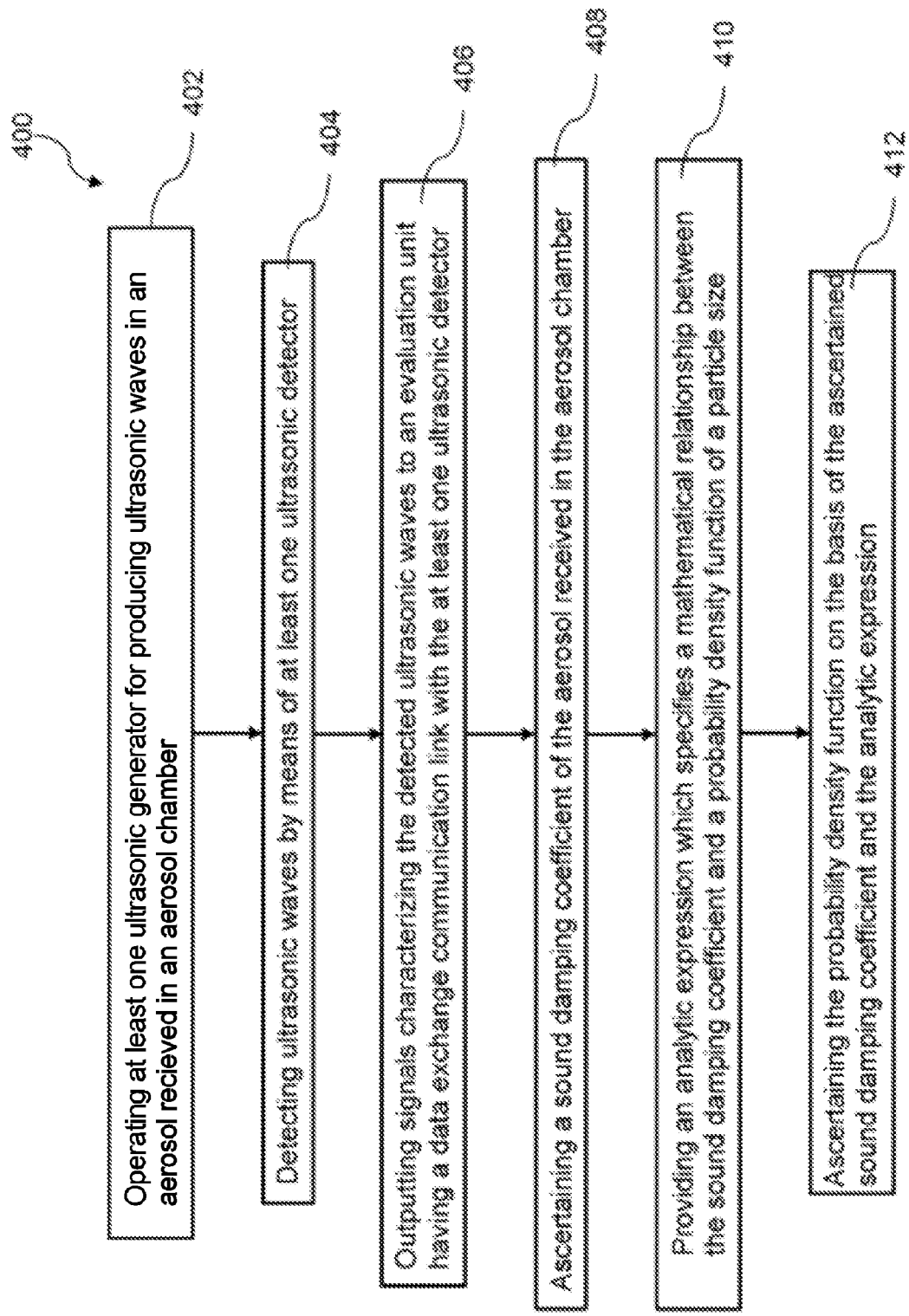
FIG. 4 shows a flowchart which elucidates an exemplary method for operating an apparatus for analyzing the particulate matter content of an aerosol.

An exemplary method for operating an apparatus according to various embodiments for analyzing the particulate matter content of an aerosol is described below with reference to the flowchart shown in FIG. 4.

The method 400 may include:
operating at least one ultrasonic generator 110, 210, 310 for producing ultrasonic waves 114, 214, 314 in an aerosol received in an aerosol chamber 102, 202, 302 (402),
detecting ultrasonic waves 114, 214',314' by at least one ultrasonic detector 112, 212, 312 (404),
outputting signals characterizing the detected ultrasonic waves 114, 214',314' to an evaluation unit 118, 218, 318 having a data exchange communication link with the at least one ultrasonic detector 112, 212, 312 (406), ascertaining a sound damping coefficient α of the aerosol received in the aerosol chamber 102, 202, 302 (408),
providing an analytic expression which specifies a mathematical relationship between the sound damping coefficient α and a probability density function N(r) of a particle sizer (410),
ascertaining the probability density function N(r) on the basis of the ascertained sound damping coefficient α and the analytic expression (412).

In the case of an apparatus having an ultrasonic transducer 309, for example the apparatus 300 according to the embodiments as shown in FIG. 3, the method may include: operating the ultrasonic transducer 309 in a generator mode during a predetermined time interval for producing an ultrasonic pulse 314 and switching the ultrasonic transducer 309 into a detector mode and operating the ultrasonic transducer 309 in the detector mode for detecting a component, reflected at a deflection area 330, of the ultrasonic pulse 314 emitted by the ultrasonic transducer 309 in the generator mode.

If an apparatus for analyzing the particulate matter content of an aerosol has an aerosol conveying arrangement 122, 222, 322 for conveying aerosol between the aerosol chamber 102, 202, 302 and its surroundings 106, 206, 306, the method may further include: operating the aerosol conveying arrangement 122, 222, 322 for conveying aerosol between the aerosol chamber 102, 202, 302 and its surroundings 106, 206, 306.

If an aerosol conveying arrangement 122, 222, 322 has a plurality of ultrasonic generators 110, 210, 310 arranged in the aerosol chamber 102, 202, 302, the method may further include: operating the ultrasonic generators 110, 210, 310 in a predetermined temporal succession, e.g. cyclically, for producing a gas pressure gradient or aerosol pressure gradient or a travelling wave in the aerosol chamber 102, 202, 302 for conveying aerosol between the aerosol chamber 102, 202, 302 and its surroundings 106, 206, 306.

Below, various examples of the present invention are described in more detail.

Example 1 is an apparatus for analyzing the particulate matter content of an aerosol. Said apparatus has: an aerosol chamber which is configured to receive an aerosol, the particulate matter content of which should be analyzed, at least one ultrasonic generator which is configured to produce ultrasonic waves in the aerosol received in the aerosol chamber, at least one ultrasonic detector which is configured to detect ultrasonic waves produced by the at least one ultrasonic generator in the aerosol, and an evaluation unit having a data exchange communication link with the at least one ultrasonic detector and being configured to ascertain the particulate matter content of the aerosol on the basis of signals output by the at least one ultrasonic detector, wherein the at least one ultrasonic generator and the at least one ultrasonic detector are positioned relative to one another such that a path length to be traversed by ultrasonic waves between the at least one ultrasonic generator and the at least one ultrasonic detector is less than 1 cm.

In example 2, the subject matter of example 1 may optionally further include the path length to be traversed by ultrasonic waves between the at least one ultrasonic generator and the at least one ultrasonic detector being less than 5 mm, optionally less than 1 mm, further optionally less than 500 μm.

In example 3, the subject matter of example 1 or 2 may optionally further have two spaced-apart substrates, wherein at least a part of the aerosol chamber, optionally the entire aerosol chamber, is formed between the two substrates.

In example 4, the subject matter of any one of examples 1 to 3 may optionally further have at least one direct detection arrangement, optionally a plurality of direct detection arrangements, having an ultrasonic generator and an ultrasonic detector embodied separately therefrom, said ultrasonic detector being positioned in the sound emission region of the ultrasonic generator.

In example 5, the subject matter of examples 2 and 4 may optionally further include the ultrasonic generator being arranged on one side of one of the two substrates, said side facing the aerosol chamber, and the ultrasonic detector being arranged opposite the ultrasonic generator on one side of the other substrate, said side facing the aerosol chamber.

In example 6, the subject matter of example 4 or 5 may optionally further include the distance between the ultrasonic generator and the ultrasonic detector being less than 1 cm, optionally less than 5 mm, further optionally less than 1 mm, further optionally less than 500 μm.

In example 7, the subject matter of any one of examples 1 to 6 may optionally further have at least one indirect detection arrangement, further optionally a plurality of indirect detection arrangements, having an ultrasonic generator, an ultrasonic detector embodied separately from the ultrasonic generator and a deflection body, wherein the deflection body has a deflection area configured to deflect ultrasonic waves emanating from the ultrasonic generator to the ultrasonic detector.

In example 8, the subject matter of examples 2 and 7 may optionally further include the ultrasonic generator and the ultrasonic detector of the indirect detection arrangement being arranged on one side of the same substrate, said side facing the aerosol chamber, wherein, further optionally, the deflection body is provided by a part of the other substrate and the deflection area is embodied as one area of the other substrate, said area facing the aerosol chamber.

In example 9, the subject matter of example 7 or 8 may optionally further include the deflection area being substantially plane, extending along a deflection area plane and being configured to deflect ultrasonic waves emanating from the ultrasonic generator to the ultrasonic detector, wherein a principal ultrasound emission direction of the ultrasonic generator includes an angle not equal to 90° with the deflection area plane.

In example 10, the subject matter of any one of examples 7 to 9 may optionally further include the distance between the ultrasonic generator and the deflection area or/and the distance between the deflection area and the ultrasonic detector being less than 5 mm, optionally less than 1 mm, further optionally less than 500 μm, further optionally less than 250 μm.

In example 11, the subject matter of any one of examples 1 to 10 may optionally further include an ultrasonic generator and an ultrasonic detector being embodied as an ultrasonic transducer which is configured to be operated in a generator mode and in a detector mode, wherein the ultrasonic transducer is configured to produce ultrasonic waves in the generator mode and detect ultrasonic waves in the detector mode.

In example 12, the subject matter of example 11 may optionally further have at least one transducer indirect detection arrangement, optionally a plurality of transducer indirect detection arrangements, having an ultrasonic transducer and a deflection body, wherein the deflection body has a deflection area which is configured to deflect ultrasonic waves produced by the ultrasonic transducer back to the latter.

In example 13, the subject matter of examples 2 and 12 may optionally further include the ultrasonic transducer being arranged on one side of one of the two substrates, said side facing the aerosol chamber, wherein, further optionally, the deflection body is provided by the other substrate and the deflection area is embodied as one area of the other substrate, said area facing the aerosol chamber.

In example 14, the subject matter of example 12 or 13 may optionally further include the deflection body having a substantially plane deflection area which extends along a deflection area plane, wherein a principal ultrasound emission direction of the ultrasonic transducer is substantially orthogonal to the deflection area plane.

In example 15, the subject matter of any one of examples 12 to 14 may optionally further include the distance between the ultrasonic transducer and the deflection area being less than 5 mm, optionally less than 1 mm, further optionally less than 500 μm, further optionally less than 250 μm.

In example 16, the subject matter of any one of examples 1 to 15 may optionally further include the aerosol chamber having an aerosol exchange connection with its surroundings, at least intermittently, optionally permanently.

In example 17, the subject matter of example 16 may optionally further have an aerosol conveying arrangement which is configured to convey an aerosol between the aerosol chamber and its surroundings.

In example 18, the subject matter of example 17 may optionally further include the aerosol conveying arrangement having at least one aerosol conveying means selected from: a micro-pump, a peristaltic drive, a thermal drive and an ultrasonic generator.

In example 19, the subject matter of example 18 may optionally further include the aerosol conveying arrangement having a plurality of ultrasonic generators arranged in the aerosol chamber, wherein the aerosol conveying arrangement is configured to drive the ultrasonic generators in a predetermined temporal succession for the purposes of producing an aerosol conveying effect.

In example 20, the subject matter of any one of examples 1 to 19 may optionally further include the aerosol chamber having a volume of less than 1000 $mm^3$, optionally of less than 500 $mm^3$, further optionally of less than 100 $mm^3$, further optionally of less than 50 $mm^3$.

In example 21, the subject matter of any one of examples 1 to 20 may optionally further include at least one part of an area delimiting the aerosol chamber having a non-stick coating.

Example 22 is a mobile apparatus, having an apparatus for analyzing the particulate matter content of an aerosol according to any one of examples 1 to 21.

In example 23, the mobile apparatus may be embodied as a cellular telephone.

Example 24 is a method for operating an apparatus according to any one of examples 1 to 21. The method includes: operating at least one ultrasonic generator for producing ultrasonic waves in an aerosol received in the aerosol chamber, detecting ultrasonic waves by means of at least one ultrasonic detector, outputting signals characterizing the detected ultrasonic waves to the evaluation unit and ascertaining the particulate matter content of the aerosol by the evaluation unit from the signals output by the at least one ultrasonic detector.

In example 25, the subject matter of example 24 may optionally further include ascertaining the particulate matter content including: ascertaining the sound damping coefficient of the aerosol received in the aerosol chamber, providing an analytic expression which specifies a mathematical relationship between the sound damping coefficient and a probability density function of a particle size, and ascertaining the probability density function on the basis of the ascertained sound damping coefficient and the analytic expression.

In example 26, the subject matter of either of examples 24 or 25 may optionally further include the apparatus for analyzing the particulate matter content of an aerosol having at least one transducer indirect detection arrangement, wherein the method may optionally further include: operating the ultrasonic transducer in a generator mode during a predetermined time interval for producing an ultrasonic pulse and switching the ultrasonic transducer into a detector mode and operating the ultrasonic transducer in the detector mode for detecting the ultrasonic pulse emitted by the ultrasonic transducer in the generator mode.

In example 27, the subject matter of any one of examples 24 to 26 may optionally further include the apparatus for analyzing the particulate matter content of an aerosol having an aerosol conveying arrangement for conveying aerosol between the aerosol chamber and its surroundings, wherein the method may optionally further include: operating the aerosol conveying arrangement for conveying aerosol between the aerosol chamber and its surroundings.

In example 28, the subject matter of example 27 may optionally further include the aerosol conveying arrangement having a plurality of ultrasonic generators arranged in the aerosol chamber, wherein the method may optionally further include: operating the ultrasonic generators in a predetermined temporal succession for producing a pressure gradient or travelling waves in the aerosol chamber for conveying aerosol between the aerosol chamber and its surroundings.

Various embodiments provide an apparatus for analyzing the particulate matter content of an aerosol and a method for operating such an apparatus, which facilitate a simple and flexible analysis of the particulate matter content of an aerosol.

In a first aspect, the aforementioned problem is achieved by an apparatus for analyzing the particulate matter content of an aerosol. Said apparatus has: an aerosol chamber which is configured to receive an aerosol, the particulate matter content of which should be analyzed, at least one ultrasonic generator which is configured to produce ultrasonic waves in the aerosol received in the aerosol chamber, at least one ultrasonic detector which is configured to detect ultrasonic waves produced by the at least one ultrasonic generator in the aerosol, and an evaluation unit having a data exchange communication link with the at least one ultrasonic detector and being configured to ascertain the particulate matter content of the aerosol on the basis of signals output by the at least one ultrasonic detector, wherein the at least one ultrasonic generator and the at least one ultrasonic detector are positioned relative to one another such that a path length to be traversed by ultrasonic waves between the at least one ultrasonic generator and the at least one ultrasonic detector is less than 1 cm.

In a further aspect, the aforementioned problem is achieved by a method for operating an aforementioned apparatus for analyzing the particulate matter content of an aerosol. The method includes: operating at least one ultrasonic generator for producing ultrasonic waves in an aerosol received in the aerosol chamber, detecting ultrasonic waves by at least one ultrasonic detector, outputting signals characterizing the detected ultrasonic waves to the evaluation unit and ascertaining the particulate matter content of the aerosol by the evaluation unit from the signals output by the at least one ultrasonic detector.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An apparatus for analyzing the particulate matter content of an aerosol, the apparatus comprising:

an aerosol chamber, formed between a first substrate and a second substrate, which is configured to receive an aerosol comprising particulate matter content to be analyzed;

an ultrasonic generator which is configured to produce ultrasonic waves in the aerosol received in the aerosol chamber;

an ultrasonic detector which is configured to detect ultrasonic waves produced by the ultrasonic generator in the aerosol; and an evaluator having a data exchange communication link with the ultrasonic detector and being configured to ascertain the particulate matter content of the aerosol based on signals output by the ultrasonic detector;

wherein the ultrasonic generator is arranged on a side of the first substrate and the ultrasonic detector is arranged on the side of the first substrate, wherein the side of the first substrate faces the aerosol chamber; and wherein the ultrasonic generator is configured to emit ultrasonic waves in a principle propagation direction perpendicular to the side of the first substrate on which the ultrasonic generator is arranged;

wherein the aerosol chamber further comprises a deflection area on the second substrate that is substantially planar, extends along a deflection area plane, and is configured to deflect to the ultrasonic detector, the ultrasonic waves emitted from the ultrasonic generator; and wherein a principal ultrasound emission direction of the ultrasonic generator includes an angle not equal to 90° with the deflection area plane.

2. The apparatus of claim 1, wherein the path length to be traversed by ultrasonic waves between the ultrasonic generator and the ultrasonic detector is less than 5 mm.

3. The apparatus of claim 1, wherein an indirect detection arrangement comprises a plurality of indirect detection arrangements, having an ultrasonic generator, an ultrasonic detector embodied separately from the ultrasonic generator and a deflection body;

wherein the deflection body has a deflection area configured to deflect ultrasonic waves emanating from the ultrasonic generator to the ultrasonic detector.

4. The apparatus of claim 3,
wherein at least one of the distance between the ultrasonic generator and the deflection area or the distance between the deflection area and the ultrasonic detector is less than 5 mm.

5. The apparatus of claim 1,
wherein the ultrasonic generator and the ultrasonic detector are embodied as an ultrasonic transducer which is configured to be operated in a generator mode and in a detector mode, wherein the ultrasonic transducer is configured to produce ultrasonic waves in the generator mode and detect ultrasonic waves in the detector mode.

6. The apparatus of claim 5, further comprising:
at least one ultrasonic transducer indirect detection arrangement having the ultrasonic transducer and a deflection body;
wherein the deflection body has a deflection area which is configured to deflect ultrasonic waves produced by the ultrasonic transducer back to the latter.

7. The apparatus of claim 6,
wherein the path length to be traversed by ultrasonic waves between the ultrasonic generator and the ultrasonic detector is less than 5 mm; and
wherein the ultrasonic transducer is arranged on one side of the first substrate or the second substrate, said side facing the aerosol chamber.

8. The apparatus of claim 6,
wherein the distance between the ultrasonic transducer and the deflection area is less than 5 mm.

9. The apparatus of claim 1,
wherein the aerosol chamber has an aerosol exchange connection with its surroundings, at least intermittently.

10. The apparatus of claim 1, further comprising:
an aerosol conveying arrangement which is configured to convey an aerosol between the aerosol chamber and its surroundings.

11. The apparatus of claim 10,
wherein the aerosol conveying arrangement has at least one aerosol conveying means selected from: a micropump, a peristaltic drive, a thermal drive and an ultrasonic generator.

12. The apparatus of claim 11,
wherein the aerosol conveying arrangement has a plurality of ultrasonic generators arranged in the aerosol chamber, wherein the aerosol conveying arrangement is configured to drive the ultrasonic generators in a predetermined temporal succession for producing an aerosol conveying effect.

13. The apparatus of claim 1,
wherein the aerosol chamber has a volume of less than 1000 mm$^3$.

14. A method for operating an apparatus,
the apparatus comprising:
an aerosol chamber, formed between a first substrate and a second substrate, which is configured to receive an aerosol comprising particulate matter content to be analyzed;
an ultrasonic generator which is configured to produce ultrasonic waves in the aerosol received in the aerosol chamber;
an ultrasonic detector which is configured to detect ultrasonic waves produced by the ultrasonic generator in the aerosol; and an evaluator having a data exchange communication link with the ultrasonic detector and being configured to ascertain the particulate matter content of the aerosol based on signals output by the ultrasonic detector;
wherein the ultrasonic generator is arranged on a side of the first substrate and the ultrasonic detector is arranged on the side of the first substrate, wherein the side of the first substrate faces the aerosol chamber; and
wherein the ultrasonic generator is configured to emit ultrasonic waves in a principal propagation direction perpendicular to the side of the first substrate on which the ultrasonic generator is arranged;
wherein aerosol chamber further comprises a deflection area that is substantially planar, extends along a deflection area plane, and is configured to deflect to the ultrasonic detector, the ultrasonic waves emanating from the ultrasonic generator; and wherein a principal ultrasound emission direction of the ultrasonic generator includes an angle not equal to 90° with the deflection area plane;
the method comprising:
operating the ultrasonic generator for producing ultrasonic waves in an aerosol received in the aerosol chamber;
detecting ultrasonic waves by means of the ultrasonic detector;
outputting signals characterizing the detected ultrasonic waves to the evaluator; and
ascertaining the particulate matter content of the aerosol by the evaluator from the signals output by the ultrasonic detector.

15. The method of claim 14,
wherein ascertaining the particulate matter content includes:
ascertaining a sound damping coefficient of the aerosol received in the aerosol chamber,
providing an analytic expression which specifies a mathematical relationship between the sound damping coefficient and a probability density function of a particle size,
ascertaining the probability density function on the basis of the ascertained sound damping coefficient and the analytic expression.

16. The method of claim 14,
wherein the apparatus for analyzing the particulate matter content of an aerosol has at least one ultrasonic transducer indirect detection arrangement, wherein the method includes:
operating a ultrasonic transducer in a generator mode during a predetermined time interval for producing an ultrasonic pulse and
switching the ultrasonic transducer into a detector mode and operating the ultrasonic transducer in the detector mode for detecting the ultrasonic pulse emitted by the ultrasonic transducer in the generator mode.

17. The method of claim 14,
wherein the apparatus for analyzing the particulate matter content of an aerosol has an aerosol conveying arrangement for conveying aerosol between the aerosol chamber and its surroundings,
wherein the method further includes:
operating the aerosol conveying arrangement for conveying aerosol between the aerosol chamber and its surroundings.

18. The method of claim 17,
wherein the aerosol conveying arrangement has a plurality of ultrasonic generators arranged in the aerosol chamber,
wherein the method includes:
operating the ultrasonic generators in a predetermined temporal succession for producing a pressure gradient in the aerosol chamber for conveying aerosol between the aerosol chamber and its surroundings.

* * * * *

UNITED STATES PATENT AND TRADEMARK OFFICE
CERTIFICATE OF CORRECTION

| | |
|---|---|
| PATENT NO. | : 11,530,968 B2 |
| APPLICATION NO. | : 16/926790 |
| DATED | : December 20, 2022 |
| INVENTOR(S) | : Alfons Dehe et al. |

It is certified that error appears in the above-identified patent and that said Letters Patent is hereby corrected as shown below:

In the Claims

Claim 8, Line 1 please change the phrase "The apparatus of claim 6" to --The apparatus of claim 1--.

Signed and Sealed this
Twenty-eighth Day of February, 2023

*Katherine Kelly Vidal*

Katherine Kelly Vidal
*Director of the United States Patent and Trademark Office*